Figure 1:
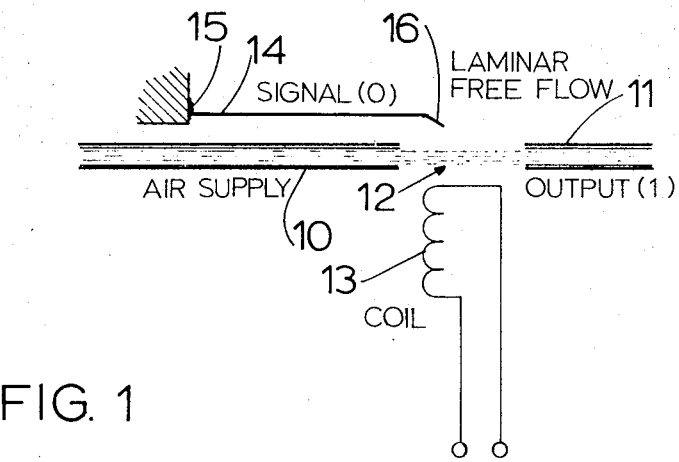

United States Patent

[11] 3,613,709

| [72] | Inventor | Paul M. Blaiklock<br>Newton Center, Mass. |
|---|---|---|
| [21] | Appl. No. | 12,558 |
| [22] | Filed | Feb. 19, 1970 |
| [45] | Patented | Oct. 19, 1971 |
| [73] | Assignee | The Foxboro Company<br>Foxboro, Mass. |

[54] ELECTRIC TO FLUIDIC SIGNAL TRANSDUCER
1 Claim, 2 Drawing Figs.

[52] U.S. Cl. .................................................. 137/81.5,
251/129
[51] Int. Cl. ........................................................ F15c 1/18
[50] Field of Search ........................................... 137/81.5,
83; 251/129, 141

[56] References Cited
UNITED STATES PATENTS
3,187,762  6/1965  Norwood .................. 137/81.5
3,234,955  2/1966  Auger ....................... 137/81.5
3,283,770  11/1966  Shebanow et al. .......... 137/83
3,516,439  6/1970  Hicks et al. ................ 137/81.5 X
FOREIGN PATENTS
831,161  2/1952  Germany .................... 137/83

*Primary Examiner*—William R. Cline
*Attorney*—Lawrence H. Poeton

ABSTRACT: A fluidic diffusion amplifier. An electromagnetic reed flexibly mounted for movement into diffusing contact with a laminar fluid stream in the flow path of the diffusion amplifier. An electromagnetic coil for receiving an electrical signal to produce a magnetic field in the area of the reed, to cause the movement of the reed into the flow path of the diffusion amplifier. An electrical input signal to the coil causes a logic output change in the diffusion amplifier.

PATENTED OCT 19 1971  3,613,709

INPUT VOLTAGE (OFF)-SIGNAL (0)

INPUT VOLTAGE (ON)
SIGNAL (1)

INVENTOR.

BY PAUL M. BLAIKLOCK

Lawrence H. Poston
AGENT

ELECTRIC TO FLUIDIC SIGNAL TRANSDUCER

This invention relates to signal conversion devices and has particular reference to means for producing fluidic output signals from input signals that are other than fluidic. As an illustration, this invention discloses input electrical signals converted to output fluidic signals.

Instrumentation for process and/or energy control, in modern applications, more and more is required to be flexible as to the nature of its components and as to the combining of diverse components. That is, it is often necessary to combine electrical, mechanical, fluidic, and other forms of components in various patterns or particular use locations, according to practical needs of various parts of different systems of application.

It becomes necessary, therefore, to provide interface means for converting signals from one form to another, as between such varied forms of system elements. It becomes especially important to provide such interface means in forms that are susceptible to miniaturization, particularly in the sense of low-energy signals, in order to be compatible with increasing modern needs in this direction, for control instrumentation.

This invention provides new and useful signal conversion means according to such needs. In particular, this invention provides a very simple transducer unit for highly sensitive conversion of low-power electrical signals to fluidic signals. Such fluidic signals, for example, may be pneumatic, air signals, as commonly used in fluid logic systems and components. The electrical input may be low-power signals, and the fluid system airflows and outputs may be small, through small passages.

Sensitivity is an important factor in low power precision devices, and in this invention, is achieved through the use of laminar flow fluidic devices of the diffusion type, wherein free flow of a laminar stream across an open space is easily diffused by small force contact with the freely flowing stream. Without such diffusion, the laminar stream continues uninterrupted into an output passage as a logic 'one' output. When the stream is thus diffused, the amount of the stream entering the output is minimal, as a logic 'zero' output.

As an example, this invention provides, for such laminar stream diffusion, a mechanical contact diffuser in the form of a metal reed, capable of being drawn into contact with a laminar stream by a magnetic field as established by applying an electrical control input signal voltage to an electrical coil located and positioned sufficiently proximate to and directionally suitable with respect to the reed to enable the reed to be magnetically drawn into diffusing contact with the laminar fluid stream while the stream is in a free-flowing state across an open space between input and output fluid passages.

The reed may be spring mounted, or resilient in itself, so as to be automatically removed from the fluid stream contact when the electrical input signal is removed.

Thus, in one form, this invention discloses a digital electrical signal input facility in conversion to a digital fluidic output. Other time base signal conversions are also natural to the device of this invention in that the duration of the fluidic output signal matches the duration of the input electrical signal.

The input may be other than electrical, in that other means may be used to move the reed.

In a simple reversal of structure, this invention may have a reed which is normally in the path of the laminar flow and which is withdrawn from that path upon the application of an input signal magnetic field thereto. In the digital sense, this produces a logic output 'one' in response to a logic input 'one', instead of the input 'one' and output 'zero' as described hereinbefore.

Figure 2:
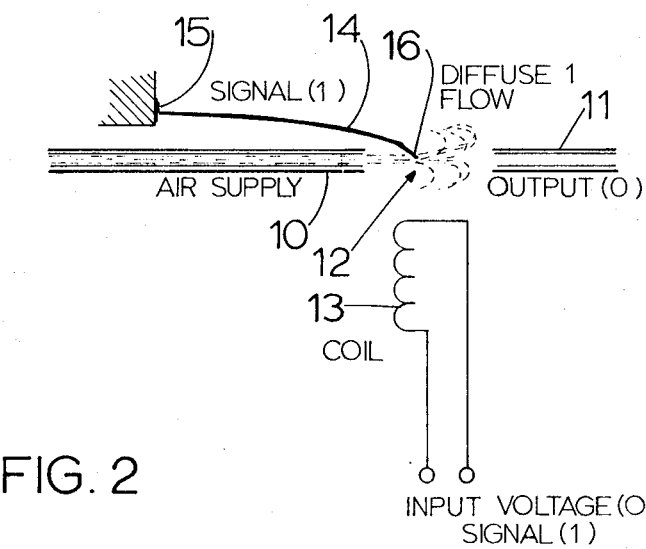

These objects and advantages, and others of this invention will be in part apparent and in part pointed out hereinafter and in the accompanying drawings, wherein:

FIG. 1 is a schematic illustration of a transducer device according to this invention, with logic 'zero' input and logic 'one' output; and FIG. 2 is a schematic illustration according to FIG. 1, with logic 'one' input and logic 'zero' output.

The main elements of the device according to this invention, as set forth in the illustrative disclosure herein, and as illustrated in both of the drawing figures in different operational modes therein; are a fluid diffusion unit, comprising an input fluid pipe 10, and an output fluid pipe 11 aligned with the input pipe and located at a distance therefrom to provide a free-flow open space 12 for unsupported laminar fluid flow, usually air, from the input pipe to the output pipe; and an electromagnetic device comprising an electrical input signal coil 13, and a resilient ferromagnetic reed 14 within the area of influence of magnetic flux generated by application of a control signal voltage to the coil 13.

The operation of the device is illustrated in FIG. 2, in that the reed 14 is drawn into contact with a laminar fluid stream in the space 12. The result is diffusion of the stream and consequent significant reduction of flow in the output, to a level sufficiently low as to become operatively insignificant, a logic zero.

The fluid diffusion unit is designed to provide a laminar airstream in free flow across the space 12 between the input pipe 10 and the output pipe 11. The parameters of the design necessary to produce laminar flow are the pressure of the air in the supply, the nature of the air, for example its viscosity, the length of the input pipe and its shape (usually straight), the inner diameter of the input pipe and the uniformity of that diameter throughout the input pipe length, and the nature of the inner surface of the input pipe, preferably uniformly smooth. Usually, for a given input pressure, specific fluid and inner pipe diameter, the necessary pipe length is readily determinable.

A further parameter is the desired length of free flow of the laminar stream between the input and the output pipes. As a matter of sensitivity, the free-flowing laminar stream should be just about ready to diffuse of its own weight when it enters the output pipe. Thus, only a touch of the mechanical reed is necessary to diffuse the stream and divert most of it to atmosphere around the device. The most sensitive area of such a stream to such a touch is adjacent the exit of the stream from the input pipe. For most purposes of this invention, a touch point essentially midway between the input and output pipes is sufficient.

The nature of the flow in the output pipe 11 is immaterial as between laminar and turbulent flow. The output signal is in terms of significant pressure, logic output 1, or low pressure, logic output 0. Thus the output pipe dimensions and structure are not critical. The output pipe needs only to contain the fluid stream sufficiently to produce a significant output pressure under conditions of logic 1 output.

Such diffusion devices are in common use and simple to construct. In this invention, however, they are used in combination with a mechanical diffusing contact, specifically the ferromagnetic reed 14 operated by magnetic flux from the coil 13.

The reed 14 may be flexible by its own nature, so that when released from the magnetic flux, it will spring back to the out-of-the-way position indicated in FIG. 1. Other suitable means may be used to bias the reed 14, or a contact finger in substitution therefor, away from the fluid stream. Also suitable means other than electrical means may be used to move the reed 14 into contact with the laminar stream. In this illustrative embodiment of this invention, a resilient mechanical reed is magnetically operated to contact and diffuse the free-flowing laminar stream.

In the illustrative construction set forth herein, the reed 14 is mounted on the body of the device at 15, and is disposed closely along the input pipe, essentially parallel thereto in its relaxed mode, toward the space 12 between the input and output pipes. The free end of the reed 14 is bent toward the diffusion device as at 16 so that contact with the fluid stream will be in the nature of a fingertip touch.

The control input signal coil 13 is located close to the open space 12, and usually across that space with respect to the reed. The reed 14 must be within the flux area of the coil 13 in terms of the voltages applied to the coil, sufficiently to be effectively operated.

Accordingly, FIG. 1 illustrates a situation of no input electrical signal, uninterrupted laminar flow, and a pneumatic output signal of logic 1. When a control signal voltage is applied to the coil 13, the reed 14 is drawn magnetically into contact with the fluid stream, diffusion occurs, and the output, pneumatic, is logic 0. Thus, input 1, output 0.

The situation of input logic 1 resulting in output logic 1 is achieved by establishing the at-rest position of the reed in the path of the laminar stream, and arranging the coil 13 to draw the reed 14 out of the path of the stream when a voltage is applied to the coil.

This invention, therefore, provides a new and useful signal transducer, wherein a fluidic diffusion amplifier is operated by an electrical signal which magnetically actuates a reed in terms of diffusion of a fluid stream in the amplifier.

As many embodiments may be made of the above invention, and as changes may be made in the embodiment set forth above without departing from the scope of the invention, it is to be understood that all matter hereinbefore set forth and in the accompanying drawings is to be interpreted as illustrative only and not in a limiting sense.

I claim:

1. For use in process and/or energy instrumentation, a signal transducer in the nature of a fluidic diffusion device wherein a laminar stream unit is established to produce one signal output mode when laminar stream in such unit is undisturbed, and another signal output mode when such laminar stream is diffused by the application of control signal means thereto; said transducer comprising, in combination:

an input pipe and an output pipe in straight-line alignment with each other and separated by an open space for free flow of a laminar stream across such space from said input pipe into said output pipe when such laminar stream is undisturbed;

said input pipe being structured to establish laminar flow therein, in terms of the necessary combination of length, inner diameter, configuration, and inner surface smoothness for a particular fluid at a particular flow rate; and a control signal applicator combination comprising a resilient ferromagnetic reed and an electrical input signal coil oppositely disposed transversely of said transducer in such manner and location that an undisturbed fluid stream across said open space from said input pipe to said output pipe, flows between said reed and said coil;

said reed comprising an elongate member mounted at one end thereof at a point upstream of said open space and extending downstream along said input pipe essentially in parallel therewith, with a free end overlying said open space;

said free end of said reed comprising a tip portion sharply bent towards said open space;

whereby a small signal applied to said signal coil results in a change of said signal output mode involving diffusion of said stream by small and partial contact of said reed tip with said laminar stream in said open space in terms of diffusion of such laminar stream due to the laminar form shattering effect of physical side touching of such stream by said reed tip.